April 2, 1946.　　　L. H. MIDDLETON　　　2,397,614
GENERATOR
Filed April 15, 1943　　　3 Sheets-Sheet 2

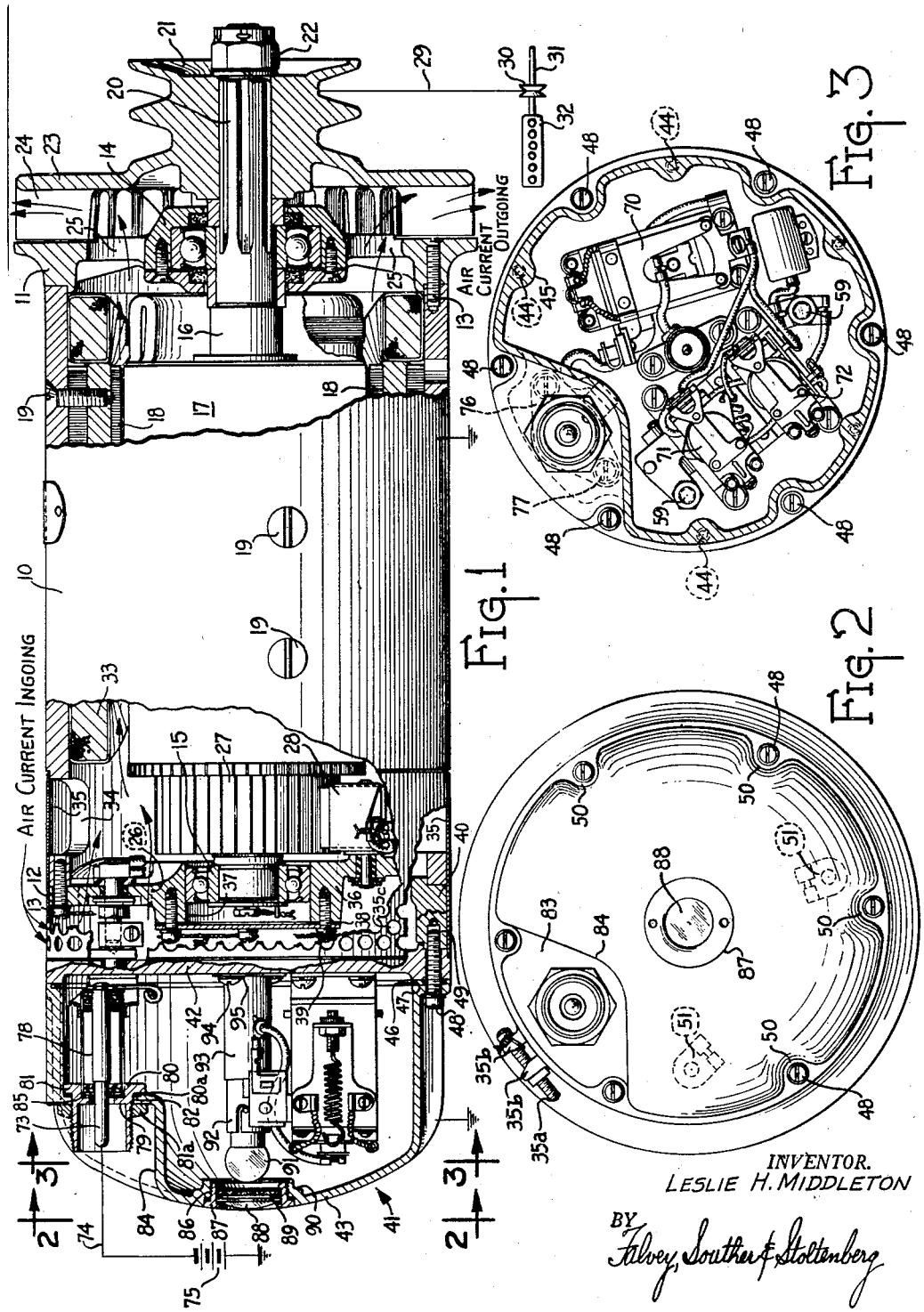

INVENTOR.
LESLIE H. MIDDLETON
BY *Falvey, Souther & Stoltenberg*

April 2, 1946.　　　　L. H. MIDDLETON　　　　2,397,614
GENERATOR
Filed April 15, 1943　　　　3 Sheets-Sheet 3
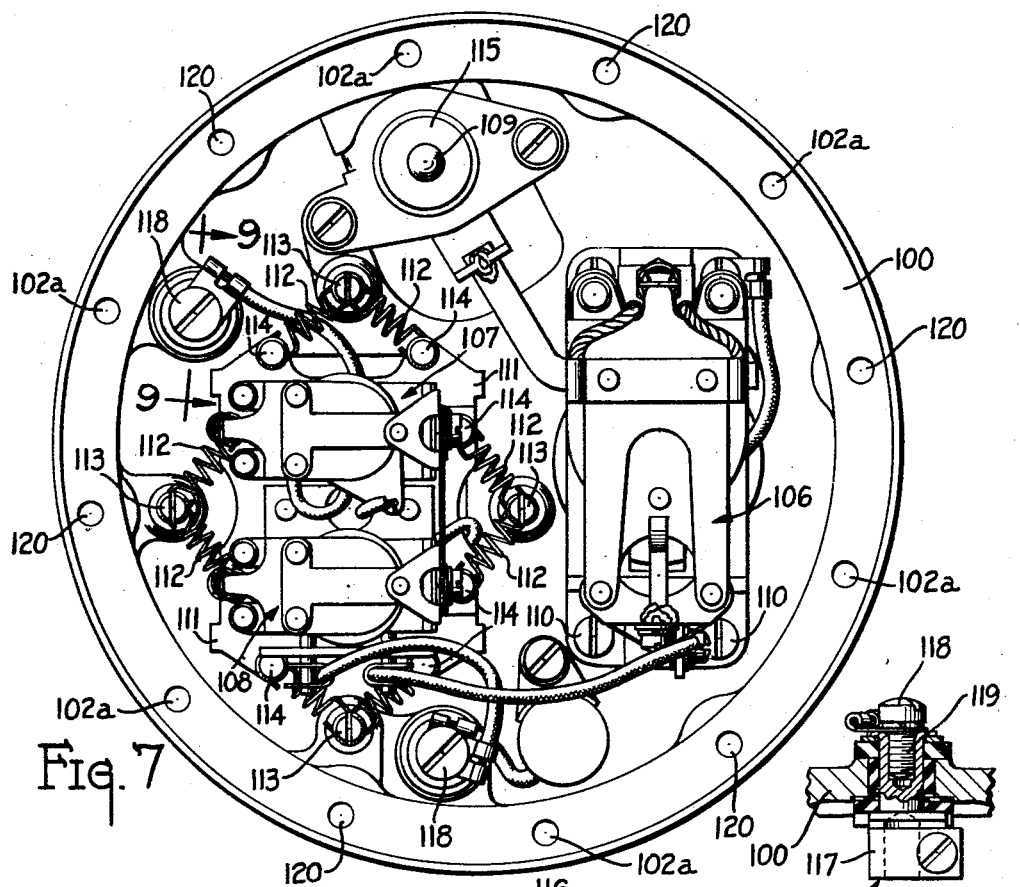
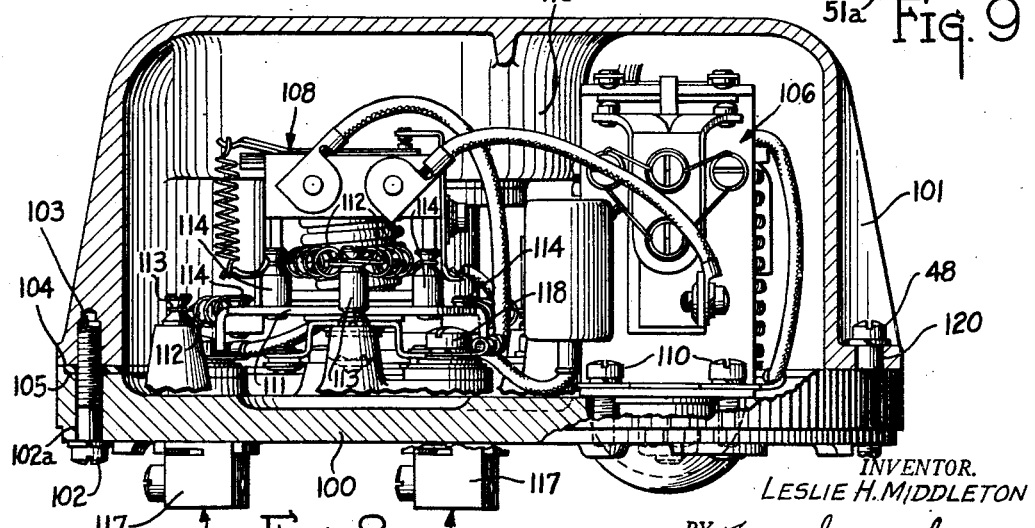
INVENTOR.
LESLIE H. MIDDLETON
BY Falvey, Souther & Stoltenberg Patented Apr. 2, 1946

2,397,614

UNITED STATES PATENT OFFICE 2,397,614

GENERATOR

Leslie H. Middleton, Toledo, Ohio

Application April 15, 1943, Serial No. 483,137

6 Claims. (Cl. 171—252)

This invention relates to variable speed generators, more particularly to variable speed generators provided with regulatory control devices forming a part of an electrical system shielded for radio emanations.

In the prior art variable speed generators provided with regulatory apparatus have been highly developed. The regulatory apparatus usually comprising a reverse-current circuit breaker, a voltage regulator and a current regulator, all co-operating with the generator to control the output characteristics thereof. The use of generators with such regulating equipment on automotive vehicles, either round wheel or track vehicles, has been so highly developed that very complicated combinations of electrical apparatus resulted. This situation was aggravated when the electrical system of the automotive vehicle was provided with wave-filtering devices and with shielding apparatus to prevent radio disturbances so that radio-receiving apparatus mounted upon the vehicle could be used for signaling purposes. The complications are burdensome under these circumstances and repairs to the electrical system become impracticable due to the fact that great difficulty is encountered in localizing a breakdown of the system. These difficulties are particularly undesirable in combat vehicles, such as tanks and the like, where a failure of the electrical system results in the vehicle becoming inoperative and, due to the fact that repairs cannot be readily made, the vehicle is often inoperative for a considerable period of time.

A principal object of this invention is to obviate the difficulties set forth in the previous paragraph by simplifying the electrical system of an automotive vehicle, particularly that of the generating system, including the generator and its regulatory equipment, and its cooperative relation with the storage battery used in connection therewith.

This object is accomplished by simplification of the shielding means and by organizing the units of the electrical system into sub-assemblies which facilitates the localization of a breakdown and allows the repair thereof in the shortest possible time by the substitution of a fully-adjusted sub-assembly in the place of the unit which has broken down.

It is further contemplated to simplify the cooperative relation between the generator, the generator regulatory apparatus and the shielding means which in a large measure obviates the use of electrical filtering devices and conducts a charging current from the generator to the battery through the agency of a single cable, the return circuit being made to the generator through a common ground connection.

The fact that the electrical system is divided into cooperative unitary sub-assemblies also facilitates the enclosing of each of the units in a protective envelope having a dual purpose, firstly, to shield each instrumentality against radio emanations and at the same time give them a protective envelope against the action of weather or the like. Inasmuch as each of the instrumentalities may be given a protective envelope, sealing of this envelope is feasible at the factory where the instruments of regulation for the generator may be carefully adjusted to predetermined standards and thereafter sealed to protect them from tampering by inexperienced personnel. The protective envelope also allows these unitary sub-assemblies to be conveniently stored in a repair station without deterioration so that they will be quickly available in a fully adjusted condition at any time repairs to disabled vehicles are necessary.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Fig. 1 is a side elevational view, partly in section, showing the completed assembled generator.

Fig. 2 is an end elevational view, taken along the line 2—2 of Fig. 1.

Fig. 3 is an end section, taken along the line 3—3 of Fig. 1.

Fig. 7 is an end plan view of another modification of the regulator housing.

Fig. 8 is a cross sectional elevation of the modification shown in Fig. 7.

Fig. 9 is a sectional elevation, taken along the line 9—9 of Fig. 7.

Figure 5:
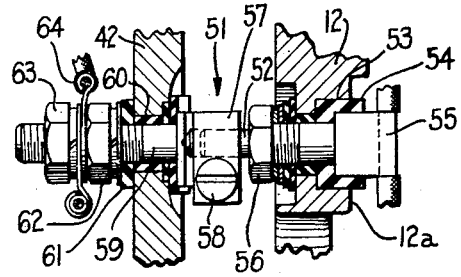
Fig. 5 is a sectional elevation of a binding post.

Referring to the drawings, particularly to Fig. 1, a relatively thick tubular frame 10 of magnetic material is provided for the generator and fitted with end heads 11 and 12 attached to the tubular portion 10 by means of screws 13 threaded into end faces of the tubular portion. The end heads 11 and 12 are provided with ball bearings 14 and 15 which journal an armature shaft 16 forming a part of an armature assembly 17 adapted to rotate between laminated pole shoes 18 of magnetic material attached to the tubular frame member 10 by means of screws 19. The armature shaft 16 projects beyond the end head 11 and is given a splined conformation 20 adapted to cooperate with a pulley 21 to form a driving connection. The pulley 21 is held on the armature shaft by means of a nut 22 fitted to a threaded portion on the end of the splined conformation 20. Adjacent the inner end of the pulley 21 an integral air fan 23 is provided having radial vanes 24 which, upon rotation of the pulley, causes the air to move outwardly as shown by the arrows whereby a cooling current of air is caused to flow through the generator in a longitudinal direction as will be described in further detail hereinafter. The end heads 11 and 12 are provided with apertures 25 and 26 which allow the air to enter and leave the generator casing under the influence of the fan.

A commutator 27 is provided for the armature 17 adjacent the bearing 15, having cooperating brushes 28 to collect the electric current generated by the armature during its rotation. The rotation of the armature is obtained through the agency of the pulley 21 by means of belt 29 driven by a pulley 30 mounted on a propeller shaft 31 of an internal combustion engine 32 which may drive the vehicle on which the generator is mounted.

The laminated pole shoes 18 are provided with field coils 33 which are preferably connected in shunt with the armature 17. It is to be understood however that the generator may be of a shunt-, compound- or third-brush type, the invention capable of being applied to all types of generators. The tubular frame 10 is provided with openings 34 adjacent the commutator 27 to allow convenient manipulation of brushes 28, or for their replacement when necessary. These apertures are covered by a plate 35 in a manner to be further described hereinafter.

The end head 12 is provided with a circular central boss 36, having a central aperture 37 in which is mounted the ball bearing 15 already described. The aperture 37 is closed by an end plate 38 of the same size as the perimeter of the boss 36, being attached thereto by means of screws 39. Adjacent the perimetrical edge, the end plate 12 is provided with longitudinally-extending spaced lugs 40, there being preferably six provided, which provide a foundation to which is attached a regulator housing 41 which comprises a base member 42, preferably of non-magnetic metals such as aluminum, and a cup-shaped casing portion 43 preferably of the same type of material.

Figure 4:
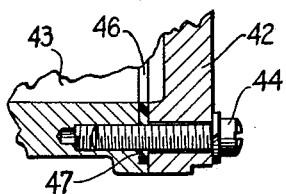
Fig. 4 is a sectional elevation of a detail.

The base member 42 is preferably attached to the casing member 43 by means of screws 44 (Fig. 4) which project through apertures in the base member 42 and are threaded into the side of the casing portion 43 which is provided with a bulge 45 on its inner side to strengthen the same adjacent the threaded aperture. Preferably there are five screws provided to attach the base member 42 to the casing member 43, and at the point of cooperation a gasket member 46 is provided between the two abutting surfaces to form a weatherproof seal. The gasket member 46 is preferably positioned in a recess 47 formed in the face of the perimetrical edge of the casing member 43.

In order to attach the sub-assembly A (Fig. 6), comprising the base member 42 and the casing member 43 including regulatory equipment to be described hereinafter, to the lugs 40 of the end plate 12 of the generator sub-assembly B, aligning apertures are provided in the two members threaded by screws 48 which cooperate with threaded apertures 49 formed in the face of the lugs 40. Referring to Figs. 2 and 3, a number of these screws 48 are provided in spaced relation around the perimeter of the casing 43, preferably six being provided to cooperate with the six lugs 40 positioned on the end plate. Inwardly-extending bays 50 are provided in the casing 43 adjacent each of the screws 48 to allow convenient manual manipulation of these screws in attaching the casing 43 to, or removing the casing 43 from the tubular frame 10 of the generator. Electrical regulatory and/or signaling apparatus are positioned within the casing 43 which are connected in circuit with the generator by conveniently manipulated binding posts 51.

Figure 6:
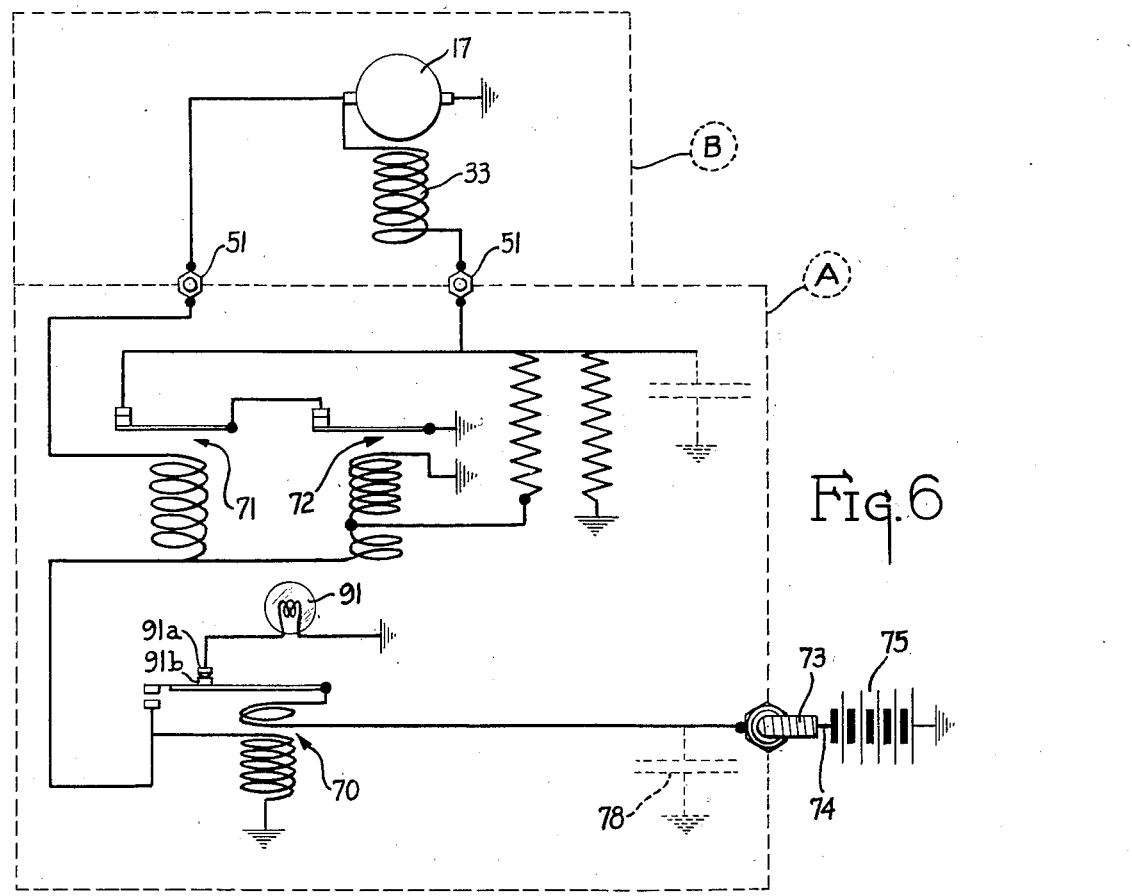
Fig. 6 is a schematic diagram of connections.

Referring to Fig. 5 of the drawings, the juxtaposition of the end plate 12 and the base plate 42 are shown enlarged to give the details of binding posts 51 which are utilized to place the regulating equipment, positioned in unitary sub-assembly A, in circuit with the generator of sub-assembly B. As shown in Fig. 6, two binding posts 51 are provided, being substantially identical in construction and are given positions as shown in phantom in Fig. 2. The stud portion 52 of the binding post is preferably positioned in an aperture 53 in the end plate 12, being carefully insulated therefrom by insulation 54. The stud 52 preferably is provided with a head 55 positioned on the inside face 12a of the end plate, being the portion by which electrical connection is made to the generator, one of the stud portions being connected to the field while the other is connected to the armature as is most clearly shown in Fig. 6. The stud portion 52 is held in position in the end plate by means of a nut 56 which cooperates with the threaded portion on the body of the stud.

Embracing the stud portion 52, a split collar 57 is provided which is contracted by a screw 58 adapted for manual manipulation to fit tightly about the stud portion 52. The split collar 57 is preferably formed as a part of the head of a bolt 59 which is positioned in an aperture 60 of the base plate 42, being insulated therefrom by insulation 61. The bolt 59 is held in position in the base plate by means of a nut 62 threaded thereon, being provided with the usual lock washers. Connection is made to the regulatory apparatus in the sub-assembly unit A by means of a second nut 63 which grips a terminal portion 64 to form a solid electrical connection.

Before the unitary sub-assembly A can be positioned on the generator sub-assembly B, and attached thereto by means of screws 48, both split collars 57 must be positioned to embrace the stud portions 52 and thereafter the screws 58 are manipulated by means of a tool, such as a screw driver, to firmly grip the stud portion to make a solid electrical connection. It is, of course, clear that the two split collars mounted on the base member 42 and the two stud portions 52 mounted on the end plate 12 will be in alignment when the screws 48 are threaded into their cooperating apertures 49 in the lugs 40 of the end plate 12. The lugs 40 are of such sufficient height to maintain a spaced relation between the base member 42 and the end plate 12 to allow the cooperative relation between the split collar portions 51 and the stud portions 52 of the binding posts to be maintained. Manipulation of screws 58 may be accomplished at a time when the plate or band 35 is removed from its position on the tubular frame 10 of the generator.

Referring to Fig. 3, regulatory equipment comprising a reverse-current circuit breaker 70, a voltage regulator 71 and a current regulator 72 are resiliently mounted on the base member 42. Each of the three instruments, namely the reverse-current circuit breaker, the voltage regulator and the current regulator are preferably resiliently mounted on the base member 42 in a manner that vibration and shocks, to which the generator is subject during use, will be absorbed by the resilient mounting and not transmitted to the regulating apparatus to destroy its efficiency for controlling the electrical characteristics of the output of the generator.

It is particularly important that the current and voltage regulators be mounted on a very flexible resilient mounting to absorb these vibrations and shocks inasmuch as these instruments are of a vibratory type in which it is very essential that the periods of vibration shall not be disturbed, otherwise their function of regulating the output of the generator will be seriously impaired if not made entirely useless. The circuit breaker 70, being of a much more rugged instrument and not operating upon a vibratory principle, it is not as essential that the resilient mounting be provided and in many cases it may be preferable to dispense with the resilient mounting entirely.

The function and the operating characteristics of these instruments are in general well known in the art and may vary widely, depending upon the particular regulating function they are to perform and to the type of equipment with which the generator is to be used. Furthermore, the characteristics of the generator itself, whether it is a shunt, a compound or a third brush generator, will largely influence the type of regulating equipment which is used in connection therewith.

The diagram of connections of the complete electrical system of the generator is shown schematically in Fig. 6 wherein the generator sub-assembly is designated by the letter B while the regulating equipment including the circuit breaker 70, the voltage regulator 71 and the current regulator 72, are connected as shown and designated generally as a unit by the letter A. The output from the generator is drawn from a binding post 73 which extends exteriorly of the casing 43 as is most clearly shown in Figs. 1, 2 and 3. As is shown in Figs. 1 and 6, the binding post 73 is connected by a single conductor 74 to a battery 75, the opposite terminal of the battery being connected to ground, ordinarily being the metal frame of an automotive vehicle so that a return circuit is made to the generator which is also grounded as is clearly shown in Fig. 1.

The binding post 73 is in the nature of a stud which is mounted by a base plate 76 (Fig. 3) attached to the base 42 by means of screws 77. The binding post 73 is preferably riveted to the base plate 76 as is clearly shown in Fig. 1, and extends substantially normal to the base 42 upon which are mounted the regulating instruments as has already been described. Adjacent the lower portion of the binding post 73, a coaxial condenser 78 is provided concentric therewith. The coaxial condenser 78 is of a type well known in the art and need not be described in further detail. It is connected in the circuit, as is clearly shown in Fig. 6, where one side thereof is grounded and the other is in contact with the binding post 73. The upper end of the coaxial condenser 78 is sealed and terminates against a shoulder 79 of a threaded sleeve 80 having an outwardly extending flange 81 to cooperate with an aperture 82 formed in the body of the cup-like cover 43 mounted over the regulating apparatus being fastened therein by means of a nut 81a. A gasket 80a is provided to seal the sleeve 80 in position in the cup-like cover 43.

The aperture 82 is formed in the floor of a depression 83, which is in substantially parallel relation with the base member 42, and a wall 84 is provided normal to the floor 83 to support the floor to define an indentation in the side of the cup-like cover 43. The purpose of this indentation is to provide a convenient means for protecting the binding post 73 by placing it inside of the outside contour of the casing of the generator. Should, for example, the generator be dropped by a careless operator, the force of the blow would not fall upon the binding post to injure it and make it inoperative.

The threaded sleeve 80 extends a considerable distance into the depression 83 in the cup-like cover 43 and surrounds the upper end of the binding post 73 to form a convenient means for attaching a shielded cable into the circuit with the generator. The shielded cable (not shown) is provided with a threaded ferrule which is capable of being screwed to the outer end of the threaded sleeve 80 while the cable is placed in contact with the binding post 73. The binding post 73 is insulated from and sealed in the sleeve 80 by means of an insulating washer 83 which is fitted between the shoulder 79 of the sleeve and the upper end of the coaxial condenser 78.

Adjacent a central portion of the cup-like cover 43, a threaded aperture 86 is provided into which is fitted a threaded sleeve 87 containing a disk of colored transparent material 88, such as glass or the like, and a screen 89 of metallic material to provide shielding for radio emanations. The transparent disk 88 and the screen 89 may be held in the sleeve 87 by any convenient means as, for example, by inturned flanges or the like. An internally-disposed boss 90 is provided in the cup-like cover 43 to give strength to the wall of the cover for supporting the sleeve 87.

Immediately below the aperture 86, as closed by the colored disk of transparent material 88, a bulb 91 is provided which is mounted in a socket 92 positioned on a column 93 attached to the base 42 by screws 94 which are fitted into outwardly extending flanges 95 formed on the column 93. The bulb 91 is placed in the electrical circuit of the generator by cooperating with the circuit breaker 70 as is clearly shown in Fig. 6. A pair of contact points 91a and 91b are provided, controlled by the circuit breaker armature so that the bulb will be illuminated when the circuit breaker is in normally open position, the illuminated bulb being clearly visible to an observer by light transmitted through the transparent disk 88. This condition will exist whenever the generator circuit, including the battery, is in non-charging relation, so that the circuit breaker 70 is open. However, when the generator has created a voltage sufficient to actuate the circuit breaker 70, the contact points 91a and 91b will be broken so that the bulb 91 will not be illuminated, indicating to an observer that the generator is charging the battery.

As has been pointed out above, the generator unit B and the regulator unit A, as shown in Fig. 6, cooperate together in the electrical sense through the agency of the separable binding posts 51 and at the same time cooperate together in a physical sense by being fastened together through the agency of the screws 48 threaded into the columns 40 which are a part of the end head 12. If, for example, a breakdown should occur in the regulating apparatus positioned within the regulator housing 41, an operator to repair this breakdown would remove the entire unit A from the electrical system by removing the regulator housing 41 from its position on the columns 40 by first removing the screws 48 from their threaded relation with the column. At the same time the cable 74 will be removed from its cooperative relation with the sleeve 80 and binding post 73, and screws 58 of the binding post 51 will be loosened so that the two portions 52 and 57 thereof may be disengaged to allow the removal of the regulator housing both from its physical and electrical cooperation with the generator.

A complete new regulator unit A, as positioned in the regulator housing 41, is substituted in the place of the regulator unit in which the breakdown occurred. This new regulator unit was fully adjusted and sealed at the factory so that it is in condition to be substituted in the place of the inoperative unit without any further electrical manipulation of the regulating instruments. It is, of course, clear that the band or plate 35, which cooperates with both the tubular housing 10 of the generator and the base plate 42 of the regulator housing, must be removed in order to make the binding post 51 available for manual operations necessary in substituting a new regulator unit for one that has had a breakdown. To do this, a bolt 35a (Fig. 2) which projects through apertures in upstanding flanges 35b, positioned on the ends of the plate 35, is loosened to expand the band to allow removal thereof from its operative position. The removal of the band 35 will open the apertures 34 in the frame 10 to allow manual adjustment of brushes or cleaning of the commutator 27, and also opens the space between the end head 12 of the generator and the base plate 42 of the regulator housing 41 to allow manipulation of the binding posts 51.

After a new regulator housing 41 has been positioned on the generator and the electrical connections made by adjustment of the binding posts 51, the band 35 is again placed in position on the tubular housing, care being taken that apertures 35c are placed over the space between the end head 12 of the generator and the base plate 42 of the regulator housing. The apertures 35c are necessary to allow entrance of air into the generator which is drawn through the generator by means of fan 23 as has already been described. That portion of the band 35 which is nearest the generator and covers openings 34 is imperforate to substantially seal the portion of the generator housing 10 adjacent the commutator 27 so that all air which enters the generator must flow through apertures 35c.

The air entering the generator flows through the apertures 35c into the space between the end head 12 of the generator and the base plate 42 of the regulator housing, then through apertures 26 in the end head 12 as is most clearly shown in Fig. 1, thence over the commutator to flow longitudinally of the armature between the pole shoes 18 and the armature 17 to be drawn out into the atmosphere by means of the fan 23. Air currents flowing in this path are given several abrupt changes of direction so that a cleaning action of the air occurs at each change of direction of flow whereby the heavy particles of dust tend by their inertia to separate themselves from the flowing air. This action may be further increased by causing the generator to be positioned as a whole in an air current which flows in a direction parallel to the axis of the axle 16 on the exterior of the generator so that the air entering the apertures 35c must turn substantially a right angle to enter the generator. If any dust particles or any extraneous material, such as sand, are carried by the stream of air flowing along the outside of the tubular casing 10 of the generator, there will be a tendency to separate these particles from the air entering the generator due to the inertia of the particles.

Referring again to the drawings, particularly to Figs. 7, 8 and 9, another modification of the regulator housing is shown which has a base plate 100 having attached thereto a cup-like container 101 by means of screws 102 fitted into holes 102a and threaded into apertures 103 in the lip of the cup-like container 101, six being provided for the purpose. A gasket 104 is seated in a recess 105 in the base plate to form a leakproof joint between the two casing portions.

On the base plate 100 are mounted a reverse-current circuit-breaker 106, a voltage regulator 107, a current regulator 108 and a binding post 109. In this instance the reverse circuit breaker is mounted directly on the base plate by screws 110 as shown in Fig. 8, no resilient cushion being provided in this instance. The voltage regulator 107 and the current regulator 108, being both of the vibratory type, are mounted on a metallic platform 111 which is resiliently mounted on the base plate 100 by means of tension springs 112 which are positioned in tension between bosses 113 on the base plate, there being four provided, one on each side of the platform 111 and bosses 114 on the platform, there being two bosses 114 on platform 111 for each boss 113 on the base plate 100. Two ends of the springs 112 cooperate with each of the bosses 113 on the base while the other end of each of the springs cooperates with a boss 114 on the platform 111. Sets of opposing springs attached to opposite ends of the platform 111 are preferably mounted in one plane, however it is preferable to mount the second set of opposed springs in a different plane as shown to give greater stability to the platform. In this manner two springs are provided for each side of the platform 111 so that, due to the tension of each of these springs, the platform is suspended in resilient relation between the four bosses 113 allowing movement of the platform and also of the voltage regulator 107 and the current regulator 108 mounted thereon freely in all directions by this resilient connection between the base member and the platform. This construction substantially isolates the voltage regulator 107 and the current regulator 108 from vibration or from jolts to which the base plate 100 is subject during use of the generator or a vehicle. The vibratory periods of these two regulators is thereby substantially undisturbed so that their efficiency in regulating the output of the generator is substantially unimpaired by extraneous effects from vibration.

The binding post 109 is mounted in substantially the same manner as has been heretofore described with reference to other modifications, being again provided with a coaxial condenser 115. The binding post again extends into a bay 116 in the external surface of the cup-shaped container 101, this bay being shown in Fig. 8 from the inside of the casing. In other respects the binding post shown in Figs. 7 and 8 serves the same function and is given substantially the same construction as the binding post shown in Figs. 1, 2 and 3.

It will be noted that in this modification of the regulator housing no visual signalling means is provided for indicating the charging condition of the generator having reference to a battery so that the contact points 91a and 91b, as described heretofore with reference to Figs. 1 and 6, has been dispensed with and these contacts have been omitted from the circuit breaker 106.

Connection of these regulating instruments is made with the generator in this regulator housing in a manner similar to that described in the other modification with the exception that the method of making connection on the inside of the regulator housing with the binding posts 51a has been changed from a bolt construction to a screw fitted into a socket formed in the binding post. This binding post is shown in Fig. 9 in detail where the embracing portion 117 is substantially identical with that shown in Fig. 5 and the screw 118 is provided to thread into a socket 119 formed in the body of the binding post. Two of these binding posts are again provided, with the screw holes 120 being located to coincide with the threaded apertures 49 in lugs 40 (Fig. 1) on the end head 12 of the generator so that the regulator housing, shown in Figs. 7 and 8, may be attached interchangeably with the regulator housing shown in Figs. 2 and 3. The binding posts and screw holes are all given a standard dimension so that the interchangeability may be readily carried through.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a generator positioned in a tubular housing, a drive shaft for the generator having a fan cooperating with one end of the housing to circulate air through the generator longitudinally thereof, a functionally-unitary weather-proof casing enclosing regulators in circuit with the generator to control the electrical characteristics of the generator output, a pair of terminals exterior of the casing adapted to cooperate with the generator when the casing is in operative position coaxially with the other end of the housing, an indentation in said casing and a single output terminal external of the casing within said indentation whereby said terminal is inside the outside contour of said casing.

2. In a device of the class described, a generator positioned in a tubular housing, a drive shaft for the generator having a fan cooperating with one end of the housing to circulate air through the generator longitudinally thereof, a functionally-unitary weather-proof casing enclosing regulators in circuit with the generator to control the electrical characteristics of the generator output, a pair of terminals exterior of the casing adapted to cooperate with the generator when the casing is in operative position coaxially with the other end of the housing, an output terminal external of said casing, a visual signaling means in circuit with one of the regulators and positioned in the casing to indicate the charging condition of the generator during operation, and a transparency in said casing through which said signaling means is visible.

3. In a device of the class described, a generator positioned in a tubular housing, a drive shaft for the generator extending from one end of said housing, a transverse wall at the opposite end of said generator, conductors through said wall from the generator, regulators mounted on said wall remote from the generator and in circuit through said conductors with the generator to control the electrical output characteristics thereof, a weather-proof cap mounted on said wall and forming a chamber therewith to house said regulator, an indentation in said cap, a single output terminal external of the cap within said indentation whereby said terminal is inside the outside contour of said casing, a visual signaling means in circuit with one of the regulators and positioned in said cap to indicate the charging condition of the generator during operation, and a transparency countersunk in said cap also within the outside contour of said casing through which said signaling means is visible.

4. In a device of the class described, a generator having a tubular field frame provided with perforated end members, an armature rotatably supported by said end members in a cooperative relation with the field frame, said armature having a commutator adjacent one end, driving means cooperating with the armature at the other end, fan means for circulating air positioned adjacent the end member cooperating with the driving means to draw air longitudinally of the armature through the perforated end members, an imperforate shielding base member mounted on the frame in cooperative relation with the perforated end member adjacent the commutator to form a chamber, regulating devices mounted on said base member having terminals sealed therein extending into said chamber to connect into electrical circuit with the generator, a shielding cover attached to said base member to form a weatherproof enclosure for the regulatory devices, and a binding post cooperating with said shielding cover to form the output terminal of the generator.

5. In a device of the class described, a generator having a tubular field frame provided with perforated end members, an armature rotatably supported by said end members in a cooperative relation with the field frame, said armature having a commutator adjacent one end, driving means cooperating with the armature at the other end, fan means for circulating air positioned adjacent the end member cooperating with the driving means to draw air longitudinally of the armature through the perforated end members, an imperforate shielding base member mounted on the frame in cooperative relation with the perforated end member adjacent the commutator to form a chamber, a perforated band attached to the base member and the frame enclosing the chamber, regulating devices mounted on said base member having terminals sealed therein extending into said chamber to connect into electrical circuit with the generator, a shielding cover attached to said base member to form a weatherproof enclosure for the regulatory devices, and a binding post cooperating with said shielding cover to form the output terminal of the generator.

6. In a device of the class described, a generator having a tubular field frame provided with perforated end members, an armature rotatably supported by said end members in a cooperative relation with the field frame, said armature having a commutator adjacent one end, driving means cooperating with the armature at the other end, fan means for circulating air positioned adjacent the end member cooperating with the driving means to draw air longitudinally of the armature through the perforated end members, an imperforate shielding base member mounted on the frame in cooperative relation with the perforated end member adjacent the commutator to form a chamber, regulating devices mounted on said base member having terminals sealed therein extending into said chamber to connect into electrical circuit with the generator, a shielding cover attached to said base member to form a weatherproof enclosure for the regulatory devices, visible signalling means cooperating with said shielding cover to indicate a condition of the regulatory devices, and a binding post cooperating with said shielding cover to form the output terminal of the generator.

LESLIE H. MIDDLETON.